US006985417B1

(12) United States Patent
Ozawa

(10) Patent No.: US 6,985,417 B1
(45) Date of Patent: Jan. 10, 2006

(54) REPRODUCTION APPARATUS AND REPRODUCTION METHOD WITH VARYING ROTATIONAL SPEED OF A DISK TYPE MEDIUM

(75) Inventor: Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/572,032

(22) Filed: May 16, 2000

(30) Foreign Application Priority Data

May 28, 1999 (JP) .............................. P11-149699

(51) Int. Cl.
*G11B 15/467* (2006.01)
(52) U.S. Cl. .................................. 369/47.38; 369/53.3
(58) Field of Classification Search ............. 369/47.55, 369/47.12, 47.38, 47.39, 84, 53.3, 30.19, 369/30.5; G11B 15/467, 19/02, 15/46
See application file for complete search history.

(56) References Cited

U.S. PATENT DOCUMENTS

| 4,847,697 | A | * | 7/1989 | Tobe ........................... 386/125 |
| 5,388,209 | A | * | 2/1995 | Akagiri ....................... 704/229 |
| 5,414,686 | A | * | 5/1995 | Iitsuka ....................... 369/47.29 |
| 5,568,467 | A | * | 10/1996 | Inagaki et al. ............. 369/275.3 |
| 5,644,561 | A | * | 7/1997 | Son et al. .................. 369/53.2 |
| 5,694,380 | A | * | 12/1997 | Shimizume et al. ....... 369/47.45 |
| 5,956,307 | A | * | 9/1999 | Koudo et al. ............. 369/47.43 |
| 5,963,521 | A | * | 10/1999 | Nagashima et al. ...... 369/53.37 |
| 5,982,728 | A | * | 11/1999 | Okamoto et al. .......... 369/47.4 |
| 6,137,642 | A | * | 10/2000 | Inoue ....................... 369/53.24 |
| 6,215,609 | B1 | * | 4/2001 | Yamashita et al. ........ 360/73.03 |
| 6,236,630 | B1 | * | 5/2001 | Kubo et al. .............. 369/47.36 |
| 6,246,651 | B1 | * | 6/2001 | Fukinuki et al. .......... 369/53.3 |
| 6,269,061 | B1 | * | 7/2001 | Shimizume et al. ....... 369/47.3 |
| 6,388,959 | B1 | * | 5/2002 | Kondo ..................... 369/30.19 |
| 6,538,967 | B1 | * | 3/2003 | Lee ......................... 369/47.46 |

FOREIGN PATENT DOCUMENTS

| JP | 01-166358 | * | 6/1989 |
| JP | 1-166358 | * | 6/1989 |
| JP | 11-66724 | * | 3/1999 |

* cited by examiner

*Primary Examiner*—A M Psitos
(74) *Attorney, Agent, or Firm*—Oblon, Spivak, McClelland, Maier & Neustadt, P.C.

(57) ABSTRACT

A reproduction apparatus and a reproduction apparatus are disclosed which can reduce the settling time until high speed continuous reproduction is resumed after such high speed continuous reproduction is interrupted. If continuous reproducing a disk-type recording medium is interrupted during high speed reproduction, then the rotational speed of the disk-type recording medium is lowered once from the speed for high speed reproduction to a normal reproduction speed. Then, when a continuous reproduction operation is performed again, the rotational speed is changed over from the normal reproduction speed to the high rotational speed for high speed reproduction.

6 Claims, 6 Drawing Sheets

FRAME STRUCTURE

| FRAME | SUB CODING FRAME |
|---|---|
| 98n+1 | SYNCHRONIZATION PATTERN |
| 98n+2 | SYNCHRONIZATION PATTERN |
| 98n+3 | P1  Q1  R1  S1  T1  U1  V1  W1 |
| 98n+4 | P2  Q2  R2  S2  T2  U2  V2  W2 |
| ⋮ | ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |

| Q1 ~ Q4 | Q5 ~ Q8 | Q9 — Q80 | Q81 ~ Q96 |
|---|---|---|---|
| CONTROL | ADDRESS | SUB Q DATA | CRC |

FIG. 3A

SUB Q DATA IN LEAD-IN AREA (TOC)

| TRACK NUMBER TNO (00) | POINT | MIN | SEC | FRAME | 0 | PMIN | PSEC | PFRAME |
|---|---|---|---|---|---|---|---|---|
| 8 | 8 | 8 | 8 | 8 | 8 | 8 | 8 | 8 |

72 BITS

FIG. 3B

SUB Q DATA IN TRACKS #1 TO #n AND LEAD-OUT AREA

| TRACK NUMBER TNO (01~99) AA | INDEX X (01~99) | MIN | SEC | FRAME | 0 | AMIN | ASEC | AFRAME |
|---|---|---|---|---|---|---|---|---|
| 8 | 8 | 8 | 8 | 8 | 8 | 8 | 8 | 8 |

72 BITS

FIG. 4

TOC CONSTRUCTION
(EXAMPLE OF DISK HAVING 6 TRACKS)

| TNO | BLOCK NO. | POINT | PMIN, PSEC, PFRAME | |
|---|---|---|---|---|
| 00 | n | 01 | 00. 02. 32 | START POINT OF TRACK #1 |
| | n+1 | 01 | 00. 02. 32 | |
| | n+2 | 01 | 00. 02. 32 | |
| | n+3 | 02 | 10. 15. 12 | START POINT OF TRACK #2 |
| | n+4 | 02 | 10. 15. 12 | |
| | n+5 | 02 | 10. 15. 12 | |
| | n+6 | 03 | 16. 28. 63 | START POINT OF TRACK #3 |
| | n+7 | 03 | 16. 28. 63 | |
| | n+8 | 03 | 16. 28. 63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49. 10. 03 | START POINT OF TRACK #6 |
| | n+16 | 06 | 49. 10. 03 | |
| | n+17 | 06 | 49. 10. 03 | |
| | n+18 | A0 | 01. 00. 00 | TRACK NUMBER OF FIRST TRACK OF DISK |
| | n+19 | A0 | 01. 00. 00 | |
| | n+20 | A0 | 01. 00. 00 | |
| | n+21 | A1 | 06. 00. 00 | TRACK NUMBER OF LAST TRACK OF DISK |
| | n+22 | A1 | 06. 00. 00 | |
| | n+23 | A1 | 06. 00. 00 | |
| | n+24 | A2 | 52. 48. 41 | START POINT OF LEAD-OUT TRACK |
| | n+25 | A2 | 52. 48. 41 | |
| 00 | n+26 | A2 | 52. 48. 41 | |
| 00 | n+27 | 01 | 00. 02. 32 | REPEATED |
| | n+28 | 01 | 00. 02. 32 | |
| | . | . | . | |

REPRODUCTION APPARATUS AND REPRODUCTION METHOD WITH VARYING ROTATIONAL SPEED OF A DISK TYPE MEDIUM

BACKGROUND OF THE INVENTION

1. Field of the Invention

This invention relates to a reproduction apparatus and a reproduction method by which digital information recorded on a disk-type recording medium can be reproduced.

2. Description of the Related Art

In recent years, disk media onto and from which audio data can be recorded and reproduced such as, for example, a mini disk (MD) and recording and reproduction apparatus on which such disk media can be used have been popularized widely.

Also an audio system which includes a combination of, for example, an MD recorder/player which is a recording and reproduction apparatus for an MD and a CD player or the like has been popularized widely.

In such a system as an MD recorder/player and a CD player or the like as described above, audio data are managed in a unit called a "program". Here, a program in the present specification signifies a set of data which are managed and recorded in a unit on a disk, and for example, with regard to audio data, it corresponds to one tune (generally called a "track") or the like. Therefore, in the following description, a program may suitably be referred to as a track.

Such an audio system as described above is usually constructed such that it can effect dubbing recording, that is, recording of audio data reproduced by the CD player onto an MD by the MD recorder/player.

Also a system which can effect high speed dubbing to reduce the recording time is available.

Upon high speed dubbing, a disk rotational driving control system and a reproduction signal processing system of the CD player are controlled so that a CD may be reproduced at a predetermined multiple speed higher than a normal reproduction speed. Also on the MD recorder/player side, a recording signal processing system is controlled so as to operate at a multiple speed corresponding to the reproduction multiple speed for a CD, and receives audio data reproduced by the CD player and records the audio data onto an MD.

For example, in an apparatus wherein a CD player as a reproduction apparatus and an MD recorder/player as a recording apparatus are integrated with each other, it is easy to control the CD player and the MD recorder/player so that they may simultaneously operate at a predetermined multiple speed so as to perform such high speed dubbing as described above. Also in another system wherein a reproduction apparatus and a recording apparatus are formed as separate units from each other, if the system is constructed such that, for example, a controlling cable or the like is used to connect the reproduction apparatus and the recording apparatus to each other so as to communicate with each other, then high speed dubbing can be realized readily by controlling operations of the reproduction apparatus and the recording apparatus in synchronism with each other.

In an accessing operation of the reproduction apparatus side upon such high speed dubbing, a start address of an object track is accessed first while a disk is driven to rotate at a predetermined multiple speed.

However, it is known that, while a disk is being rotated at a high speed, it is difficult to appropriately effect a leading-in operation of tracking servoing if accessing such as, for example, feeding of an optical head along a radial direction of a disk is involved.

It is considered that this arises from the fact that, since, for example, when a disk is rotated at a high speed, the disk whirls in a shorter period with regard to a radial direction of the disk which is caused by eccentricity of the disk, also tracks formed along a circumferential direction of the disk whirl in a shorter period and tracking servoing is less liable to follow up a track.

When it is tried to actually execute high speed dubbing in such a situation as described above, if tracking servo control is not executed appropriately in such a manner as described above, then the possibility increases that such a disadvantage that, for example, on the recording apparatus side, since a PLL (Phase Locked Loop) circuit for detecting a channel clock signal suitable for recording data inputted thereto cannot establish a locked condition, recording signal processing cannot be executed appropriately in synchronism with the recording data supplied from the reproduction apparatus side may increase.

One of possible countermeasures for solving the problem described above is, for example, to drive a CD to rotate at a high multiple speed as a CAV (Constant Angular Velocity) whereas a CD is usually driven to rotate at a CLV (Constant Linear Velocity) as well known in the art. Further, a buffer memory such as a DRAM (Dynamic Random Access Memory) is provided and used such that data read out from a CD are stored once into the buffer memory and then signaled to the MD recorder/player side at a transfer rate lower than the rate upon writing.

Where the system is constructed in this manner, for example, even if tracking leading-in control for a CD is retried as a result of an error therein, data stored already in the buffer memory can be supplied as recording data to the MD recorder/player side. Then, if the CD player succeeds in the retrying of the tracking leading-in control for the CD and re-starts reproducing the CD before the data stored in the buffer memory are all signaled, then the continuity of recording data is maintained.

However, where the system has the construction described above, it is necessary to additionally install a memory element as the buffer memory and adopt a new construction for communication with a main system controller (microcomputer). Consequently, increase of the cost and the circuit scale cannot be avoided.

Further, in this instance, it is necessary for practical use to raise the error correction capacity for reproduction data (for example, error correction processing for C1 and C2 parities is set heavier than double or quadruple to raise the error correction capacity). This increases a processing burden.

SUMMARY OF THE INVENTION

It is an object of the present invention to provide a recording apparatus and a recording method by which, even when a moving operation of an optical head along a radial direction of a disk-type recording medium is performed in order to perform reproduction of the disk-type recording medium, for example, at a rate higher than a normal rate so that high speed dubbing may be performed appropriately, that is, to perform reproduction of the disk-type recording medium while the disk-type recording medium is driven to rotate at a speed higher than a normal speed, a condition wherein appropriate servo control is executed can be entered as rapidly as possible.

In order to attain the object described above, according to an aspect of the present invention, there is provided a reproduction apparatus, including rotational driving means for driving a disk-type recording medium to rotate, reproduction head means for reproducing digital information recorded on the disk-type recording medium driven to rotate by the rotational driving means, feeding means for feeding the reproduction head means in a radial direction of the disk-type recording medium, and control means for controlling the rotational driving means to change over a rotational speed of the disk-type recording medium such that, within a period in which the reproduction head means reproduces the digital information recorded on the disk-type recording medium, the disk-type recording medium is rotated at a first rotational speed, but when the reproduction head means is fed in the radial direction of the disk-type recording medium by the feeding means, the disk-type recording medium is rotated in a second rotational speed which is lower than the first rotational speed.

According to another aspect of the present invention, there is provided a reproduction method for a reproduction apparatus which includes a reproduction head for reproducing digital information recorded on a disk-type recording medium and a feeding mechanism for feeding the reproduction head in a radial direction of the disk-type recording medium, including the steps of driving the disk-type recording medium to rotate at a first rotational speed within a period in which the digital information is reproduced from the disk-type recording medium, and driving the disk-type recording medium to rotate at a second rotational speed which is lower than the first rotational speed when the reproduction head is fed in a radial direction of the disk-type recording medium.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3A is a diagrammatic view showing a data structure of sub Q data in a Lead-In Area;

FIG. 3B is a diagrammatic view showing a data structure of sub Q data in tracks #1 to #n and a Lead-Out Area;

FIG. 4 is a table showing a construction of data of a Table of Contents;

DESCRIPTION OF THE PREFERRED EMBODIMENT

In the following, a preferred embodiment of the present invention is described. A reproduction apparatus according to the embodiment of the present invention described below is formed as a CD reproduction section which forms a recording and reproduction apparatus in the form of a CD/MD combination apparatus which can perform reproduction of a CD and recording and reproduction of an MD and besides can perform dubbing recording wherein audio data reproduced from a CD are recorded onto an MD.

Description is given in the following order.
1. Sub Codes and the TOC of a CD
2. Construction of the Recording and Reproduction Apparatus
3. High Speed Dubbing Operation in the Embodiment
4. Modifications 1. Sub Codes and the TOC of a CD First, the TOC (Table of Contents) and sub codes recorded on a CD are described.

The TOC is recorded in a Lead-In Area, and sub codes are inserted in data in such a manner as hereinafter described.

The minimum unit of data recorded on a disk of the CD type is one frame. One block is formed from 98 frames.

Figures 1, 2A, 2B:
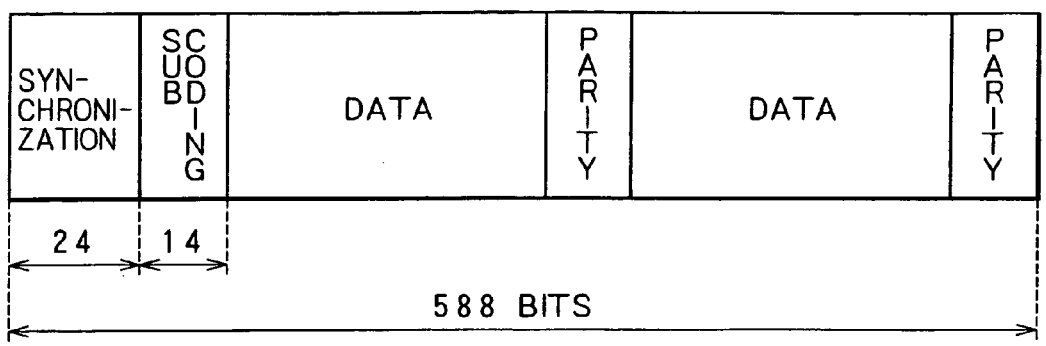
FIG. 1 is a diagrammatic view showing a data structure of a frame which is a recording unit of a recording medium on the reproduction side.
FIG. 2A is a diagrammatic view showing a data structure of sub code data including 98 frames.
FIG. 2B is a diagrammatic view showing a data structure of Q channel data illustrated in FIG. 2A.

One frame has such a structure as shown in FIG. 1.

Referring to FIG. 1, one frame is composed of 588 bits, and 24 bits at the top are used for synchronization data and the following 14 bits are used as a sub code data area. Data and parities follow the sub code data area.

One block is formed from 98 frames having the construction just described, and sub code data extracted from such 98 frames are collected to form such a block of sub code data as shown in FIG. 2A.

The sub code data from the first and second frames (frame 98n+1 and frame 98n+2) at the top of the 98 frames represent a synchronization pattern (sync pattern). The sub code data from the third to 98th frames (frame 98n+3 to frame 98n+98) represent channel data each formed from 96 bits, that is, sub code data P, Q, R, S, T, U, V and W.

Of the channel data mentioned, the channel data of the P channel and the Q channel are used for management of accessing and so forth. However, each of the P channel data merely indicates a pause portion between tracks, and finer control is performed with the Q channel data (Q1 to Q96). The Q channel data of 96 bits is constructed in such a manner as illustrated in FIG. 2B.

Referring to FIG. 2B, the four bits of Q1 to Q4 are control data used for the audio channel number, the emphasis, identification between a CD-ROM disk and a CD-DA (digital audio) disk, identification of whether or not digital copying is permitted, and so forth.

The following 4 bits of Q5 to Q8 represent an address which indicates contents of control bits of the sub Q data.

The following 72 bits of Q9 to Q80 represent sub Q data, and the remaining bits of Q81 to Q86 represent a CRC (Cyclic Redundancy Check Code).

In the Lead-In Area, the sub Q data described above is used as TOC information.

In particular, the sub Q data of the 72 bits of Q9 to Q80 in the Q channel data read in from the Lead-In Area has such information as illustrated in FIG. 3A. The sub Q data includes data each composed of 8 bits.

Referring to FIG. 3A, a track number is recorded first. In the Lead-In Area, the track number is fixed to "00".

The track number is followed by the POINT (point) and further by the MIN (minute), SEC (second) and FRAME (frame number) which represent an elapsed time in the track.

Further, the PMIN, PSEC and PFRAME are recorded. The PMIN, PSEC and PFRAME have meanings which depend upon the value of the POINT.

When the value of the POINT is one of values from "01" to "99", it signifies a track number. In this instance, the PMIN, PSEC and PFRAME represent the start point (absolute time address) of a track of the track number as minute (PMIN), second (PSEC) and frame number (PFRAME), respectively.

When the value of the POINT is "A0", the track number of the first track is recorded in the PMIN. Further, the PSEC indicates a distinction in specification such as a distinction among a CD-DA (digital audio) disk, a CD-I and a CD-ROM (XA specifications).

When the value of the POINT is "A1", the track number of the last track is recorded in the PMIN. Therefore, the number of tracks recorded can be grasped from the track number recorded in the PMIN.

When the value of the POINT is "A2", the start point of the Lead-Out Area is represented as an absolute time address by the PMIN, PSEC and PFRAME.

Consequently, the end address of the last track recorded on the disk can be grasped from the start point of the Lead-Out Area.

For example, in the case of a disk on which 6 tracks are recorded, the TOC based on such sub Q data as described above has data recorded in such a manner as seen in FIG. 4.

Referring to FIG. 4, the six tracks all have the same track number of "00".

The Block No. indicates the number of sub Q data of one unit read in as block data based on the 98 frames as described above.

Each TOC data has same contents written over three blocks.

As seen from FIG. 4, where the POINT is "01" to "06", the PMIN, PSEC and PFRAME represent the start points of the first track #1 to sixth track #6, respectively.

When the POINT is "A0", "01" is indicated as the first track number in the PMIN. Further, the disk is identified based on the value of the PSEC, and the value of the PSEC is "00" for an ordinary CD for audio data. It is to be noted that, where the disk is a CD-ROM (XA specifications), the value of the PSEC is defined as PSEC= "20", but where the disk is a CD-I, the value of the PSEC is defined as PSEC="10".

The track number of the last track is recorded in the PMIN at a position where the value of the POINT is "A1". Meanwhile, the start point of the Lead-Out Area is indicated in the PMIN, PSEC and PFRAME at another position where the value of the POINT is "A2".

In the succeeding blocks beginning with the block number n+27, the contents of the blocks n to n+26 are recorded repetitively.

In the program area in which tunes and so forth are recorded as the tracks #1 to #n and in the Lead-Out Area, the sub Q data recorded there have such information as illustrated in FIG. 3B.

First, the track number is recorded. In particular, in each of the tracks #1 to #n, the track number has one of the values from "01" to "99". Meanwhile, in the Lead-Out Area, the track number is "AA".

Then, information which can divide each track further finely is recorded as an index.

Further, the MIN (minute), SEC (second) and FRAME (frame number) are indicated as an elapsed time in the track.

Furthermore, in the AMIN, ASEC and AFRAME, an absolute time address is recorded in the minute (AMIN), second (ASEC) and frame number (AFRAME).

2. Construction of the Recording and Reproduction Apparatus

Now, a construction of an MD/CD combination apparatus which is a recording and reproduction apparatus to which the present invention is applied is described.

Figure 5:
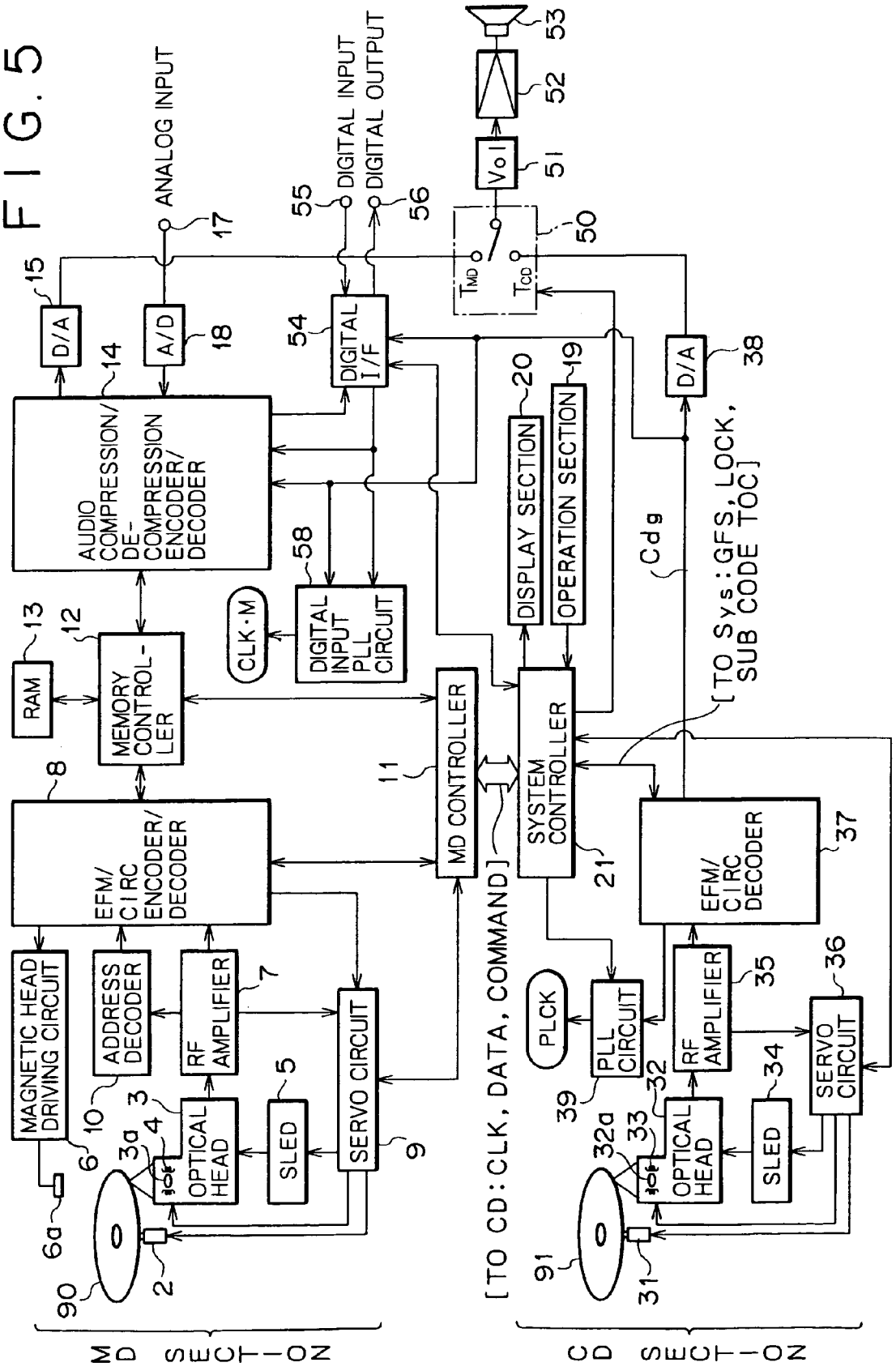
FIG. 5 is a block diagram showing an MD/CD combination apparatus to which the present invention is applied.

Referring to FIG. 5, a magneto-optical disk (mini disk; MD) 90 is loaded into an MD section which performs a recording and reproduction operation onto and from an MD.

The MD 90 is used as a medium onto which audio data can be recorded, and is driven to rotate by a spindle motor 2 upon recording/reproduction.

Upon recording/reproduction, an optical head 3 irradiates a laser beam upon the MD 90 as a magneto-optical disk so that it operates as a head upon recording/reproduction. In particular, upon recording, the optical head 3 outputs a laser beam of a high level for heating a recording track to a Curie temperature. However, upon reproduction, the optical head 3 outputs a laser beam of a comparatively low level for detecting data from reflected light from the MD 90 by a magnetic Kerr effect.

To this end, the optical head 3 includes an optical system which in turn includes a laser diode, a polarizing beam splitter, an objective lens 3a and so forth, and a detector for detecting reflected light. The objective lens 3a is supported for displacement in a radial direction of and in a direction toward or away from the MD 90 by a biaxial mechanism 4. Further, the entire optical head 3 is mounted for movement in a radial direction of the MD 90 by a sled mechanism 5.

A magnetic head 6a is disposed in an opposing relationship to the optical head 3 across the MD 90. The magnetic head 6a operates to apply to the MD 90 a magnetic field modulated with data supplied thereto.

The optical head 3 and the magnetic head 6a are supported for movement in a radial direction of the MD 90 by the sled mechanism 5.

Information detected from the MD 90 by the optical head 3 upon reproduction operation is supplied to an RF (radio frequency) amplifier 7. The RF amplifier 7 performs arithmetic processing for the information supplied thereto to extract a reproduction RF signal, a tracking error signal, a focusing error signal, groove information and other necessary information from the information. The groove information is FM-modulated absolute position information recorded on wobbled grooves which are recorded tracks of the MD 90. The extracted reproduction RF signal is supplied to an encoder/decoder 8.

Meanwhile, the tracking error signal and the focusing error signal are supplied to a servo circuit 9, and the groove information is supplied to and demodulated by an address decoder 10. Address information decoded from the groove information and address information, sub code information and so forth recorded as data and decoded by the encoder/decoder 8 are supplied to an MD controller 11 formed from a microcomputer so that they are used for various controls.

It is to be noted that the MD controller 11 functions as a member which executes various operation controls of the MD section.

The servo circuit 9 generates various servo driving signals based on the tracking error signal and the focusing error signal supplied thereto from the RF amplifier 7, a track jump instruction from the MD controller 11, an access instruction, rotational speed detection information of the spindle motor 2, and so forth to control the biaxial mechanism 4 and the sled mechanism 5 to effect focusing and tracking control and control the spindle motor 2 to rotate at a constant linear velocity (CLV).

The reproduction RF signal is subject to decoding processing such as EFM demodulation and CIRC (Cross Interleave Reed-Solomon Coding) in the EFM/CIRC encoder/decoder 8. It is to be noted that reading of data from the MD 90 by the optical head 3 and transfer of reproduction data in a system from the optical head 3 to a buffer memory 13 are performed at the rate of 1.41 Mbit/sec intermittently.

The data written in the buffer memory 13 are read out at a timing at which transfer of the reproduction data is performed at the rate of 0.3 Mbit/sec, and are supplied to an audio compression/decompression encoder/decoder 14. The data supplied to the audio compression/decompression encoder/decoder 14 are subject to reproduction signal processing such as decoding processing corresponding to audio compression processing so that they are converted into digital audio data sampled with 44.1 KHz and quantized with 16 bits. The digital audio data are converted into an analog signal by a D/A converter 15 and then supplied to a terminal $T_{MD}$ of a switch circuit 50.

Upon reproduction operation for the MD 90, the switch circuit 50 is controlled by a system controller 21, which controls operation of the entire apparatus, so that it may be connected to the terminal $T_{MD}$. Accordingly, a reproduction audio signal outputted from the audio compress/decompression encoder/decoder 14 and converted into an analog signal by the D/A converter 15 is supplied through the switch circuit 50 to a sound volume adjustment section 51 and a power amplifier 52 and is outputted as a reproduction audio output from a speaker 53.

It is to be noted that, while writing/reading out of data into/from the buffer memory 13 are performed with an address designated by control of a write pointer and a read pointer by the memory controller 12, since the bit rates upon writing and reading out are made different from each other as described above, some amount of data is normally stored in the buffer memory 13.

Since a reproduction audio signal is outputted through the buffer memory 13 in this manner, even if tracking is brought out of order, for example, by a disturbance, the reproduction audio output is not interrupted, and for example, by accessing a correct tracking position to re-start data reading out while some stored data remains in the buffer memory 13, the operation can be continued without having an influence on the reproduction output. In other words, the vibration withstanding function can be augmented significantly.

The present recording and reproduction apparatus further includes a digital interface (I/F) 54, and digital audio data decoded by the audio compression/decompression encoder/decoder 14 upon reproduction is supplied also to the digital interface 54. The digital interface 54 encodes the received digital audio data into a data stream of a predetermined digital interface format using reproduction data and sub code information and so forth extracted simultaneously upon reproduction. The data stream can be outputted from a digital output terminal 56 and is outputted, for example, as an optical digital signal. In other words, the digital audio data can be outputted to an external apparatus while they remain digital data.

When a recording operation is performed for the MD 90, an analog audio signal which is a recording signal supplied to an analog input terminal 17 is converted into digital data sampled with 44.1 KHz and quantized with 16 bits by an A/D converter 18. The digital data is supplied to the audio compression/decompression encoder/decoder 14, by which audio compression encoding processing for compressing data to approximately ⅕ in amount is performed for the digital data.

Also it is possible to record data fetched through the digital interface 54 onto the MD 90. In particular, a signal of a digital interface format supplied to a digital input terminal 55 from an external apparatus is decoded by the digital interface 54 so that digital audio data, sub codes and so forth are extracted from the signal. The control information such as the sub codes is supplied to a system controller 21, and the digital data sampled with 44.1 KHz and quantized with 16 bits as recording data are supplied to the audio compression/decompression encoder/decoder 14, by which audio compression encoding processing for compressing data to approximately ⅕ in amount is performed for the digital data.

Furthermore, for the MD 90, it is also possible to record audio data reproduced from a CD 91 by a CD section onto the MD 90 which is hereinafter described. This is dubbing recording. In this instance, CD reproduction data cdg which are digital audio data reproduced from the CD 91, outputted from an EFM/CIRC decoder 37, and sampled with the sampling frequency of 44.1 KHz and quantized with 16 bits are supplied to the audio compression/decompression encoder/decoder 14, by which audio compression encoding processing for compressing data to approximately ⅕ in amount is performed for the digital audio data.

A digital input PLL circuit 58 receives the digital audio data inputted through the digital interface 54 or the CD reproduction data cdg outputted from the CD section which is hereinafter described and produces a clock signal CLK•M synchronized with a synchronizing signal inserted in the audio data inputted. The clock signal CLK•M has a predetermined frequency equal to a multiple of, for example, fs=44.1 KHz.

The clock signal CLK•M is divided or multiplied into a signal of a required frequency and can be utilized at least as a clock signal for signal processing in the audio compression/decompression encoder/decoder 14 and data transfer for inputting to and outputting from the audio compression/decompression encoder/decoder 14 upon recording of data inputted in the form of digital data to the MD section.

The recording data compressed by the audio compression/decompression encoder/decoder 14 is written once into the buffer memory 13 by the memory controller 12 and then read out at a predetermined timing and sent to the EFM/CIRC encoder/decoder 8. Then, the recording data is subject to encoding processing such as CIRC encoding and EFM demodulation by the EFM/CIRC encoder/decoder 8 and then supplied to a magnetic head driving circuit 6.

The magnetic head driving circuit 6 supplies a magnetic head driving signal to the magnetic head 6a in response to the thus encoded recording data. In short, application of a magnetic field of the N or S pole by the magnetic head 6a is executed for the MD 90. In this instance, the MD controller 11 supplies a control signal to the optical head 3 so that it may output a laser beam of the recording level.

In order to perform a recording/reproduction operation onto/from the MD 90, management information recorded on the MD 90, that is, the P-TOC (pre-mastered TOC) and the U-TOC (user TOC), need be read out. The MD controller 11 discriminates an address of an area to be recorded on the MD 90 or an address of an area to be reproduced based on the management information. The management information is stored into the buffer memory 13. To this end, the buffer memory 13 has divisionally set thereon a buffer area for such recording data/reproduction data as described above and an area for storing such management information as mentioned above. It is to be noted that, in the P-TOC, a recording track is formed from a pit train, and in the U-TOC, a recording track is formed from a wobbled groove. Further, the P-TOC area is an area only for reproduction, and the U-TOC area is a recordable area.

The MD controller 11 reads out the management information by causing a reproducing operation of the innermost circumferential side of an MD, on which the management information is recorded, to be executed when the MD 90 is loaded into the MD section. The management information is stored into the buffer memory 13 so that it can be referred to later upon a recording/reproduction operation onto/from the MD 90.

While the U-TOC is edited and rewritten in response to recording or erasure of data, each time a recording/erasure operation is performed, the MD controller 11 performs such editing processing for the U-TOC information stored in the buffer memory 13 and rewrites the U-TOC area of the MD 90 at a predetermined timing in accordance with the rewriting operation.

The recording and reproduction apparatus further includes a reproduction system for a CD.

A CD 91 which is an optical disk for reproduction only is loaded into a CD section which performs a CD reproduction operation.

The CD 91 is driven to rotate at a constant linear velocity by a spindle motor 31 upon reproduction operation. Data recorded in the form of pits on the CD 91 is read out by an optical head 32 and supplied to an RF amplifier 35. In the optical head 32, an objective lens 32a is supported by a biaxial mechanism 33 for displacement in tracking and focusing directions.

Further, the optical head 32 is supported for movement in a radial direction of the CD 91 by a sled mechanism 34.

The RF amplifier 35 produces a reproduction RF signal as well as a focusing error signal and a tracking error signal. The error signals are supplied to a servo circuit 36.

The servo circuit 36 produces various driving signals including a focusing driving signal, a tracking driving signal, a sled driving signal and a spindle driving signal from the focusing error signal and the tracking error signal and controls operation of the biaxial mechanism 33, sled mechanism 34 and spindle motor 31.

The reproduction RF signal is supplied to the EFM/CIRC decoder 37. The EFM/CIRC decoder 37 first performs binary digitization of the reproduction RF signal inputted thereto to obtain an EFM signal. Then, the analog input terminal 17 performs EFM demodulation, CIRC decoding and so forth for the EFM signal so that it decodes the information read from the CD 91 into digital audio data sampled with 44.1 KHz and quantized with 16 bits.

The EFM/CIRC decoder 37 is constructed so that it can also extract control data such as the TOC and sub code data. The TOC and the sub code data are supplied to the system controller 21 and used for various controls.

The EFM signal obtained by the binary digitization of the EFM/CIRC decoder 37 is supplied also to a PLL circuit 39.

The PLL circuit 39 outputs a clock signal PLCK synchronized with channel bits of the EFM signal inputted thereto. The clock signal PLCK has a frequency of 4.3218 MHz in a normal speed operation. The clock signal PLCK is utilized as a clock signal, for example, by a signal processing system beginning with the EFM/CIRC decoder 37.

Further, in the signal processing process of the EFM/CIRC decoder 37, a signal GFS (Guarded Frame Sync) and another signal LOCK are obtained.

The EFM/CIRC decoder 37 executes interpolation protection processing when it performs synchronization detection of a frame sync (sync pattern) of the EFM signal inputted thereto as well known in the art. Describing simply, an interpolation counter is reset at a timing at which a frame sync of the EFM signal latched in response to the clock signal PLCK is detected. Then, if a frame sync is detected again after, for example, 2,352 bytes, then it is determined that the interpolation timing is in synchronism, and a window is set. If a frame sync is not detected within the window, then interpolation is performed at the timing of the window.

Here, in a condition wherein no window is set, frame syncs detected are determined all valid and handled as a reset input to the interpolation counter. On the other hand, in another condition wherein a window is set, only a frame sync detected at a timing within the window is validly used for resetting, and any frame sync detected at a timing outside the window is determined invalid and handled as an illegal sync. Then, if an illegal sync (interpolation processing) successively appears, for example, for a predetermined number of frames, then it is determined that interpolation synchronism is lost and a window is opened, and frame syncs detected are all set as all being valid for synchronization.

The signal GFS mentioned above has the High level when the timing of a frame sync detected and the interpolation protection timing described above coincide with each other, but has the Low level when they do not coincide with each other.

The signal GFS is sampled, for example, with 460 Hz, and if it has the High level when sampled, the signal LOCK has the High level. However, if the signal GFS exhibits the High level successively by eight times, then the signal LOCK changes from the High level to the Low level.

A condition wherein both of the signal GFS and the signal LOCK exhibit the High level corresponds to a condition wherein the PLL circuit 39 is in a locked state.

Accordingly, for example, if the signal GFS and the signal LOCK are supplied from the EFM/CIRC decoder 37 and the system controller 21 as seen in FIG. 5, then the system controller 21 can discriminate whether or not the PLL circuit 39 is in a locked state. In other words, it can be discriminated whether or not reproduction signal processing of the CD section is being executed appropriately.

The digital audio data outputted from the EFM/CIRC decoder 37 is converted into an analog audio signal by a D/A converter 38 and supplied to a terminal $T_{CD}$ of the switch circuit 50. Upon reproduction operation of a CD, the system controller 21 controls the switch circuit 50 to select the terminal $T_{CD}$ so that a reproduction audio signal reproduced from the CD 91 and converted into an analog signal by the D/A converter 38 is supplied to the sound volume adjustment section 51 and the power amplifier 52 through the switch circuit 50 and outputted as a reproduction audio signal from the speaker 53.

Further, in the present reproduction and recording apparatus, digital audio data reproduced from a CD can be dubbing recorded directly onto an MD 90. In this instance, digital audio data outputted from the EFM/CIRC decoder 37 is supplied as it is to the audio compression/decompression encoder/decoder 14.

Also digital audio data outputted from the EFM/CIRC decoder 37 is supplied to the digital interface 54 so that CD reproduction data cdg in the form of digital data can be outputted from the digital output terminal 56 to an external apparatus.

In order to reproduce the CD 91, the TOC which is management information recorded on the CD 91 needs to be read out. The system controller 21 discriminates the number and addresses of tracks recorded on the CD 91 based on the management information and performs reproduction operation control. To this end, the system controller 21 causes a reproduction operation on the innermost circumference side of the CD 91 on which the TOC is recorded to be executed to read out the TOC when the CD 91 is loaded, and stores the TOC, for example, into an internal RAM of the system controller 21 so that it may thereafter refer to the TOC upon reproduction operation for the CD 91. The TOC which is management information recorded on the CD 91 corresponds to sub Q data illustrated in FIGS. 2A, 2B, 3A and 4.

The system controller 21 is a microcomputer which controls the entire apparatus, and provides various instructions to the MD controller 11 so that operation control of the MD section may be executed by the MD controller 11. Upon recording or reproduction of the MD 90, the system controller 21 receives management information such as sub codes from the MD controller 11.

Meanwhile, in the CD section, for example, the MD controller 11 directly performs operation control.

Here, in the present reproduction and recording apparatus, the MD controller 11 outputs a command COMMAND and so forth for providing various instructions to the MD controller 11, for example, in response to a clock signal CLK of a predetermined frequency obtained based on the clock signal PLCK obtained on the CD section side, various data DATA, and, for example, a reproduction operation of the CD section. The data DATA includes information of, for example, the TOC and sub codes obtained upon reproducing the CD.

It is to be noted that such a form of the control system as described above is a mere example, and for example, a CD controller which performs control of the CD side may be provided additionally. Or, the system controller 21 and the MD controller 11 may alternatively be formed as a single controller.

An operation section 19 includes a recording key, a reproduction key, a stop key, an AMS (Auto Music Search) key, a cue/review key, a dubbing key for setting of normal speed dubbing/high speed dubbing and other necessary keys such that they can be operated by a user so that reproduction/recording operations regarding the MD 90 and the CD 91 may be performed.

Further, the operation section 19 allows inputting of a character string for recording incidental data such as a track name onto the MD 90, a registration determination operation and a registration mode operation.

Operation information from the operation section 19 is supplied to the system controller 21, and the system controller 21 controls the other components to execute required operations based on the operation information and an operation program.

It is to be noted that, though not shown in FIG. 5, the operation section 19 may additionally have, for example, a remote control operation function by an infrared remote commander.

A display section 20 performs a required displaying operation upon reproduction or recording of the MD 90 or CD 91. In particular, the display section 20 displays time information such as, for example, a total play time or an elapsed time upon reproduction or recording and other required information such as a track number, an operation state or an operation mode under the control of the system controller 21.

In the recording and reproduction apparatus constructed in such a manner as described above, an MD reproduction operation, an MD recording operation, a CD reproduction operation and a dubbing operation from a CD onto an MD can be performed.

Particularly in the present reproduction and recording apparatus, it is also possible to execute a normal speed dubbing operation as a dubbing operation from a CD onto an MD. However, also it is possible to execute a high speed dubbing operation at a predetermined multiple speed. It is to be noted, however, that, while the multiple speed upon high speed dubbing may be set arbitrarily in the apparatus of the present invention, it is presupposed in the following description that the apparatus can execute high speed dubbing according to a double speed (double speed dubbing).

Where the reproduction and recording apparatus has such a construction as described hereinabove with reference to FIG. 5, operation of double speed dubbing can be performed, for example, in the following manner.

First, the servo circuit 36 of the CD section sets the speed to the double speed CLV and drives the spindle motor 31. In this state, reproduction of data from the CD 91 is performed. Further, the PLL circuit 39 sets the target value for locking, for example, corresponding to the double speed to 2×4.3218=8.6436 MHz. It is to be noted that such changeover of the target value for the PLL circuit 39 is controlled by the system controller 21. Naturally, for triple speed dubbing, the target value is set to 3×4.3218 MHz.

Consequently, when the PLL circuit 39 is in a locked state, the CD 91 is rotated stably at the double speed CLV, and normal signal processing is executed at the double speed by the EFM/CIRC decoder 37 (and D/A converter 38).

Then, since data is processed at the double speed in this manner, CD reproduction data cdg (sampled with a sampling frequency of 88.2 KHz (=44.1×2) and quantized with 16 bits) having a transfer rate equal to twice that in a normal speed operation is transmitted to the audio compression/decompression encoder/decoder 14 of the MD section side.

The CD reproduction data cdg according to the double transfer rate is inputted also to the digital input PLL circuit 58. The digital input PLL circuit 58 sets the target value so that it may be locked with a channel clock frequency equal to twice the normal speed. The changeover of the target value is performed under the control of the MD controller 11, for example, in accordance with a command (COMMAND) from the system controller 21.

Consequently, while the digital input PLL circuit 58 is in a locked state, a frequency equal to twice that upon normal rate operation is obtained as the clock signal CLK•M. Then, for example, the audio compression/decompression encoder/decoder 14 performs signal compression processing and data writing into the buffer memory 13 by the memory controller 12 to execute recording signal processing synchronized with the CD reproduction data cdg of the double transfer rate supplied from the CD section.

Further, operation timings until data stored in the buffer memory 13 are recorded onto the MD 90 through reading into the EFM/CIRC encoder/decoder 8 and signal processing by the EFM/CIRC encoder/decoder 8 are obtained suitably utilizing, for example, the master clock supplied from the MD controller 11 side or a clock signal obtained upon rotational control utilizing a frequency of wobbles formed on the MD.

As can be recognized from the foregoing description, upon recording, since the reading out speed is set higher than the writing speed of data into the buffer memory 13, recording in the MD section is performed intermittently onto the MD 90. In particular, if an amount of data greater than a certain predetermined amount is stored in the buffer memory 13, then writing of data onto the MD 90 is performed. Then, if the stored data amount of the buffer memory 13 becomes smaller than the predetermined amount or becomes "0" as a result of the data writing operation, then the MD section waits until the predetermined amount of data with which writing is possible is stored. Such operations as just described are repetitively executed.

Therefore, the rotational driving speed of the CD 91 and the transfer rate and the signal processing rate of input/output data to/from the EFM/CIRC encoder/decoder 8 upon double speed dubbing need not necessarily be set to the double speed in a corresponding relationship to reproduction being performed at the double speed by the CD section side.

In particular, even if the MD 90 is driven to rotate at the normal speed and the input/output rates of data to/from the EFM/CIRC encoder/decoder 8 and the signal processing speed by the EFM/CIRC encoder/decoder 8 are set to the normal rates and speed, data recording onto the MD 90 is executed appropriately by such operation to make the writing rest period onto the MD 90 shorter than that upon normal speed operation or to perform continuous recording operation without performing intermitting recording.

However, depending upon conditions of, for example, the capacity of the buffer memory 13, the rotational driving speed of the CD 91 and the transfer rate of input/output data to/from the EFM/CIRC encoder/decoder 8 and the signal processing speed in the EFM/CIRC encoder/decoder 8 may be set to the double speeds.

3. High Speed Dubbing Operation in the Embodiment

In the present reproduction and recording apparatus, high speed dubbing (for example, double speed dubbing) can be performed in such a manner as described above. However, as described in connection with the problem of the prior art, for example, in a condition that rotational driving of a CD at a double speed is being performed for high speed dubbing, when the optical head 32 is fed upon accessing operation or the like, there is a high degree of possibility that an error may occur even if it is tried to perform servo pulling-in control so as to enter an on state from an off state of a tracking servo loop.

Thus, in the present reproduction and recording apparatus, for example, when it is tried to feed the optical head 32 for accessing, the CLV of a normal speed (normal speed CLV) is temporarily set as a rotational driving speed for a disk. In particular, as a speed lower than the CLV of the double speed (double speed CLV), the normal speed CLV is selected. If setting to the normal speed CLV is performed in this manner, then a condition that the possibility that the servo pulling-in control of tracking may be executed appropriately is raised is obtained.

Then, if tracking servo control is executed appropriately under the condition of the normal speed CLV in such a manner as described above to complete accessing, then the speed control changes to the double speed CLV. Then, if it is discriminated that the condition of the double speed CLV rotation is stabilized, then outputting of reproduction CD data reproduced from the CD is started to start double speed dubbing onto the MD 90.

Processing operation for realizing the high speed dubbing operation (double speed dubbing operation) of the present reproduction and recording apparatus having such a construction as described above is illustrated in FIG. 6. It is to be noted that the processing illustrated in FIG. 6 is executed suitably by the system controller 21 and the MD controller 11.

Figure 6:
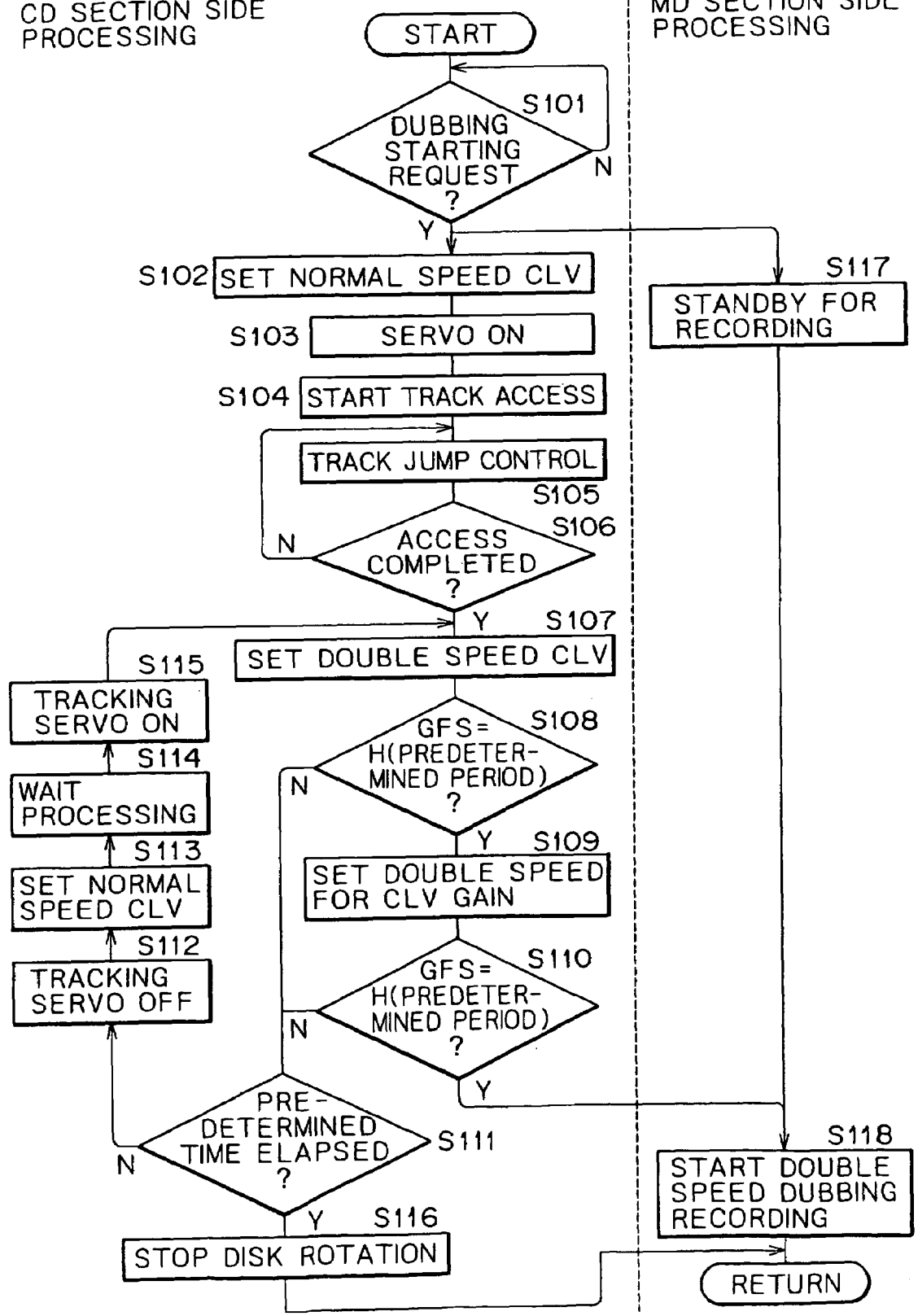
FIG. 6 is a flow chart illustrating a procedure of control of the reproduction and recording side apparatus of the MD/CD combination apparatus of FIG. 5.

Referring to FIG. 6, first in step S101, the system controller 21 detects whether or not a dubbing starting request according to a key operation by a user is present. Then, if it is assumed that, for example, a user operates the operation section 19 to input an instruction to start double speed dubbing, then a dubbing starting request is generated by the operation section 19. Then, in response to the dubbing starting request, the system controller 21 advances its processing to step S102.

On the other hand, if the MD controller 11 is informed, for example, from the system controller 21 that an affirmative result is obtained in step S101, then it controls pertaining functioning circuit sections of the MD section side so that they may enter a recording standby state as seen in step S117. The recording standby state signifies a state wherein, for example, an operation mode suitable for recording is set for each of the pertaining functioning sections of the MD section side and writing of data onto the MD 90 is stopped.

In step S102, the speed of rotation of the CD 91 is set to the normal speed CLV. Corresponding to this, the PLL circuit 39 sets its target value so that the channel clock signal PLCK of 4.3218 MHz corresponding to the normal speed may be obtained.

Then, while the CD 91 is driven to rotate at the normal speed CLV, processing for turning the focusing servo loop, the tracking servo loop and the CLV servo on is executed in step S103. Consequently, a state wherein information such as TOC information can be read out from the CD 91 by the optical head 32 is established.

Then, in next step S104, the system controller 21 starts control for accessing an object address which makes a reproduction starting position. Then in step S105, the system controller 21 executes track jumping control for moving the laser beam irradiation position of the optical head 32 to the object address. As the track jumping control, the system controller 21 executes control processing for feeding the optical head 32 in accordance with a distance from its current position to the accessing position in a radial direction of the disk while controlling, if necessary, the sled mechanism 34. However, if the current position is so near to the accessing position that the optical head 32 need not be fed by the sled mechanism 34, then the system controller 21 executes control for moving the objective lens to the accessing position by means of the biaxial mechanism 33.

The processing for the track jumping control in step S105 described above is executed until it is discriminated in step S106 that the accessing is completed. After it is discriminated in step S106 that the accessing is completed, the system controller 21 advances its processing to step S107.

Whereas the rotational driving speed of the CD 91 is the normal speed CLV until the step S107 is reached, processing for setting the rotational driving speed of the CD 91 to the double speed CLV is executed in step S107. The processing here is limited to such processing for setting the target value so that, for example, the clock signal PLCK extracted by the PLL circuit 39 may be 8.6436 MHz (=2×4.3218 MHz), but CLV gain setting corresponding to the double speed CLV is not performed. Thus, in this stage, a CLV gain corresponding to the normal speed and lower than that at the double speed CLV remains set. The reason of this is hereinafter described.

After the double speed CLV is set in step S107 as described above, the system controller 21 supervises the signal GFS inputted from the EFM/CIRC decoder 37 in step S108. Then, the system controller 21 discriminates whether or not a condition of the signal GFS=High level is obtained over a certain predetermined period. In other words, the system controller 21 discriminates whether or not the disk rotational driving speed as the double speed CLV is so stable that CD reproduction data cdg at the double speed can be obtained appropriately.

If an affirmative result is obtained in step S108, then the processing of the system controller 21 advances to step S109, but if a negative result is obtained, then the processing advances to step S111.

In step S109, the system controller 21 sets the CLV gain to a predetermined gain corresponding to the double speed CLV. Consequently, for example, the spindle motor 31 drives to rotate the CD 91 with a torque suitable for the double speed CLV.

Then, also in next step S110, the system controller 21 discriminates similarly as in step S108 described hereinabove whether or not the condition of the signal GFS=High level is obtained over a certain predetermined period.

The case wherein an affirmative result is obtained in step S110 corresponds to a case wherein the CD 91 is driven to rotate appropriately at the double speed CLV and the PLL circuit 39 is in a locked state and consequently CD reproduction data cdg according to a stable rate of the double speed CLV can be outputted.

Therefore, in this instance, the system controller 21 and the MD controller 11 advance their processing to step S118, in which they execute required control processing so that dubbing recording at the double speed CLV is started.

It is to be noted that the reason why the double speed CLV is set after completion of the accessing such that a CLV gain corresponding to the double speed is set at a certain predetermined timing after the double speed CLV is set first in steps S107 and S109 is such as follows.

If it is assumed otherwise such that, when the speed is changed from the normal speed CLV to the double speed CLV, the processes in step S107 and step S109 are performed simultaneously, then the spindle motor 31 is driven to rotate with a gain corresponding to the double speed CLV from the initial stage so that the rotational driving speed of the double speed CLV may be reached. This signifies an operation to vary the speed from the normal speed CLV to the double speed CLV in such a manner that the speed of rotation may rise suddenly.

As well known in the art, in a CD player or the like, normally a CD is held at a central position thereof under a pressure from above and below by a chucking mechanism and is driven to rotate in this state.

Further, it is known that, if the acceleration in rotational speed is high as in the foregoing description, then the CD cannot follow up the rotational force and is liable to suffer from a phenomenon that it slips while it is held by the chucking mechanism. If this phenomenon occurs, then since the disk cannot be held effectively, such a condition occurs that, for example, tracking servoing is rendered ineffective or the linear velocity of a track as viewed from the optical head side is displaced from a target velocity and the PLL circuit 39 is brought out of a locked state.

Therefore, as in the present reproduction and recording apparatus, the double speed CLV is first set in step S107 while the CLV gain suitable, for example, for the normal speed CLV is maintained, and then, after the processing in step S107, the speed changing operation is performed so that transition from the normal speed CLV to the double speed CLV may be performed with a low acceleration. Consequently, such a situation that a CD fixed by a chucking mechanism suffers from slipping as described above is prevented. Then, after a state wherein the CD is driven to rotate stably at the normal speed CLV in this condition, a CLV gain corresponding to the double speed CLV is set as the processing in step S109 as described above so that a target driving condition by the double speed CLV can be obtained completely.

If a negative result is obtained in step S108 or S110 described above, that is, if it is discriminated that the PLL circuit 39 is not in a locked state during setting of the double speed CLV, the processing of the system controller 21 advances to step S111.

In step S111, the system controller 21 discriminates whether or not a certain predetermined time elapses after a point of time at which, for example, the step S111 is reached first. Here, if it is not discriminated that the predetermined time elapses, then the system controller 21 advances its processing to step S112.

In step S112, the system controller 21 turns the tracking servo loop off once, and then in step S113, the system controller 21 sets the normal speed CLV again. At this time, also the CLV gain is changed to a value thereof corresponding to the normal speed CLV. Then in next step S114, the system controller 21 executes standby processing of waiting for a predetermined time set in advance until a condition wherein the speed of rotation in the normal speed CLV is stabilized is obtained. Thereafter, the system controller 21 turns the tracking servo loop on in step S115, whereafter it returns its processing to step S107.

The processing of the system controller 21 when it returns to step S107 through the processing in steps S111 to S115 described above corresponds to a retrying operation. In particular, in the processing stage of steps 107 to 110, if the situation is such that a locked state of the PLL circuit 39 is not obtained from some cause or the rotational driving speed of the disk is not stabilized or else tracking servo leading-in control is not performed successfully, the double speed CLV is set again after the speed control is returned to the normal speed CLV until a stable operation is obtained.

However, if it is discriminated in step S111 that the predetermined time elapses although a locked state of the PLL circuit 39 is not obtained even if the retrying operation described above is executed repetitively over a predetermined time, the system controller 21 advances its processing to step S116. In step S116, the system controller 21 stops the rotational driving of the CD 91 so that double speed dubbing may not be executed.

It is to be noted that, if the rotational driving of the CD is stopped from such a situation as described above, then the user may perform, for example, an operation for changing over to normal speed dubbing as a countermeasure.

Since the processing is executed in such a manner as described above, the normal speed CLV is set upon accessing upon starting of dubbing or upon accessing operation during reproduction. Consequently, for example, tracking servo control is executed appropriately and also accessing can be executed in a condition wherein also the PLL circuit can be locked appropriately. Then, in a condition wherein tracking servo control is executed intermittently after accessing is completed, the double speed CLV is set. Consequently, also the speed change from the normal speed CLV to the double speed CLV can be performed smoothly while tracking servo control is not brought out of order or the PLL circuit is brought out of a locked state.

It is to be noted that, while, in the processing operation described above, the MD section side is controlled such that it may be brought into a recording standby state in a stage before double speed setting by the CD section side is completed. However, it may otherwise be possible that the MD section side is brought into a recording standby state in a stage after double speed setting by the CD section side is completed.

Notwithstanding the processing sequence described hereinabove with reference to FIG. 6 is adopted, and the reason is described below.

Firstly, a speed changing operation between the normal speed CLV and the double speed CLV is performed each time the processing in steps S102 to S116 which is processing on the CD section side is executed, and each time such speed changing processing is performed, it is tried to prevent the PLL circuit 58 on the MD section side from being brought out of a locked state.

Secondly, it is tried to apply the processing illustrated in FIG. 6 to a case wherein double speed dubbing is performed in a reproduction mode in which random accessing between tracks (tunes) may possibly be requested such as a programmed reproduction mode or a shuffle reproduction mode on the CD section side in such a manner as described below.

In particular, when reproduction of a certain track comes to an end and a next track is accessed during reproduction of a CD in a programmed reproduction mode or a shuffle reproduction mode, if the MD section side is not placed in a recording pause state, then such a trouble that a period in which accessing is performed is recorded as it is as a silence period occurs. In order to avoid this, the MD section side should be placed into a recording pause state at a timing at which an operation of accessing a next track is started, and to this end, the processing described hereinabove in connection with step S117 is required as described below.

Thus, the processing described hereinabove with reference to FIG. 6 where it is applied to a case wherein programmed reproduction or shuffle reproduction is performed on the CD section side is described.

It is to be noted that, as well known in the art, the program reproduction is a mode of reproduction wherein reproduction proceeds in a track reproduction order selectively designated by an operation of a user. Meanwhile, the shuffle reproduction is a mode of reproduction wherein track numbers to be reproduced are designated at random, for example, based on random numbers generated in the inside and track reproduction is proceeded in accordance with the thus designated track numbers.

The processing described hereinabove with reference to FIG. 6 corresponds to processing performed when reproduction of a CD is performed in order of the track number as can be recognized from a flow of the processing of FIG. 6. Since a CD has data recorded physically successively in order of the track number thereon, as far as reproduction is performed in the order of track number, normally there is no chance wherein random accessing is performed, for example, at an end of a track after reproduction is started once. On the other hand, if programmed reproduction or shuffle reproduction is performed on the CD section side, then there possibly is a chance in which random accessing is performed at an end of a track.

Figure 7:
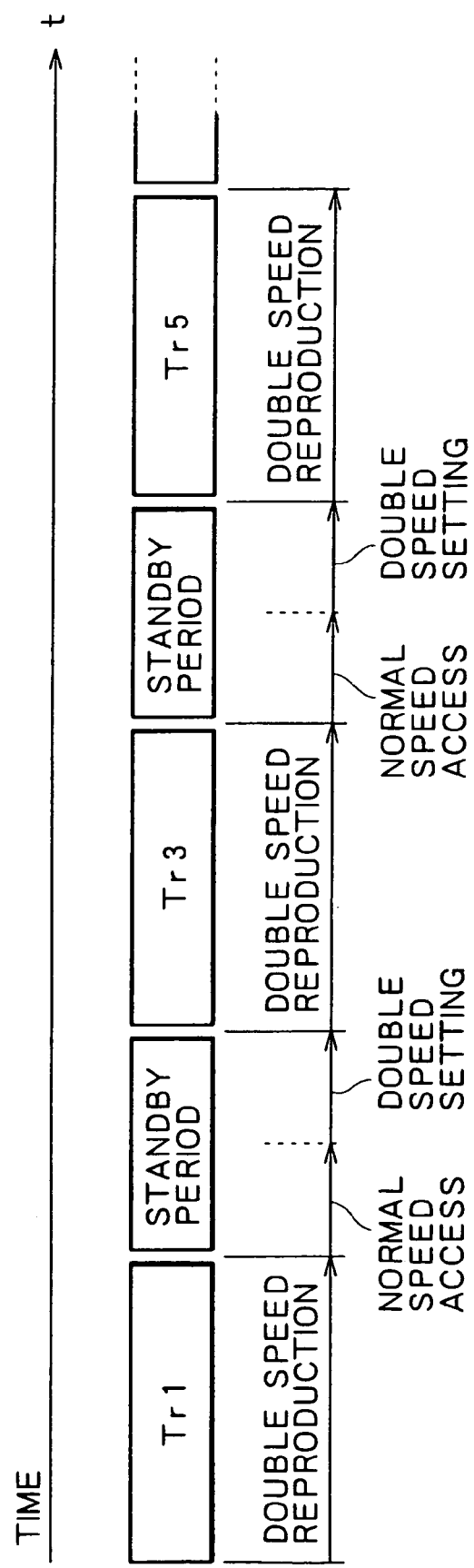
FIG. 7 is a timing chart illustrating a timing of rotational control upon high speed dubbing on the reproduction side.

Operation when double speed dubbing is performed by such programmed reproduction or shuffle reproduction is illustrated in FIG. 7.

Referring to FIG. 7, there is illustrated a case wherein, upon reproducing a CD, reproduction is performed in order of the tracks Tr1→Tr3 →Tr5 . . . . In order to effect double speed dubbing of data reproduced from the CD in accordance with the track order just mentioned, the track Tr1 is first reproduced by the double speed CLV as seen from FIG. 7. Then, after reproduction of the track Tr1 comes to an end, accessing to a reproduction starting position (address) of the track Tr3 is executed by the normal speed CLV, and after the accessing is completed, setting of the double speed CLV is performed. Then, if a condition wherein the PLL circuit 39 is locked is obtained while the double speed CLV is set, then reproduction of the track Tr3 is started by the double speed CLV. Here, the reproduction starting position of the track Tr3 is accessed by the normal speed CLV as described above, and thereafter, the period in which the double speed is set actually makes a standby period in which no sound is outputted.

Then, after reproduction of the track Tr3 comes to an end, the track Tr5 is accessed by the normal speed CLV in a similar manner, and a standby period in which the double speed CLV is set is provided. Thereafter, reproduction of the track Tr5 by the double speed CLV is performed.

In order to realize such operation as described above, the following processing should be executed in accordance with the processing described hereinabove with reference to FIG. 6.

First, the processing itself illustrated in FIG. 6 is used as a processing routine in a state wherein double speed dubbing is being executed. Then, the processing in step S101 is replaced by processing of discriminating whether or not there is an access request for accessing a next track. The accessing request is generated by the system controller 21 when random accessing is required, for example, because the end position of a track having been reproduced till then and the start position of a next track are physically spaced from each other.

The double speed dubbing operation described hereinabove with reference to FIG. 7 can be realized by such processing construction as just described. In short, for example, after reproduction of the track Tr1 comes to an end, it is discriminated in step S101 whether or not an access request is obtained, and thereafter, the processing in steps S102 et seq. is performed.

Here, the processing in steps S102 to S106 is an accessing operation according to the normal speed CLV within a standby period, and the processing in steps S107 to S110 (or S116) is an operation of setting the double speed CLV within the same standby period. Then, if an affirmative result is obtained in step S110, then the standby period is ended, and the processing advances to step S118. In short, the double speed dubbing of the track Tr3 is started. Such processing is executed each time reproduction of a current track comes to an end and a request for random accessing to a next track is received.

Then, according to the processing described hereinabove with reference to FIG. 6 in connection with double speed dubbing of program reproduction or shuffle reproduction, if it is discriminated in step S101 that an access request is present, then control on the MD section side is executed so that a recording standby state may be entered by the processing in step S117.

As a result of such a flow of processing, the MD section side enters a recording pause state at a timing at which accessing to a next track is started. Then, after the accessing on the CD section side is completed and the double speed CLV is set appropriately, the double speed dubbing is re-started by the processing in step S118.

By the operation described above, a recording pause state is obtained while recording onto the MD 90 is not performed within each standby period illustrated in FIG. 7 as described also hereinabove, and in all sections corresponding to standby periods, recording of a silence condition is prevented. This prevents, for example, an unnecessarily long silence period from being formed between tracks of the MD 90 for which dubbing recorded has been performed, and the recording capacity of the MD 90 can be saved.

4. Modifications

In the processing of FIG. 6 described hereinabove, the signal GFS is utilized in order to detect the stability of a rotational driving speed when the double speed CLV is set. In particular, as described also hereinabove, it is discriminated based on the signal GFS whether or not the PLL circuit 39 is in a locked state corresponding to the double speed CLV thereby to discriminate the stability of the rotational driving speed in the double speed CLV.

Conversely speaking, if some phenomenon of a state or the like of a signal which varies depending upon a state wherein the PLL circuit 39 is locked and another state wherein the PLL circuit 39 is not locked is utilized even if the signal is not the signal GFS, then the system controller 21 can discriminate the stability of the rotational driving speed as the double speed CLV.

Thus, it is possible to discriminate the stability of the rotational driving speed as the double speed CLV not based on the signal GFS but based on, for example, such factors as given below.

First, it is possible to utilize the signal LOCK. The signal LOCK is obtained by sampling the signal GFS with 460 Hz and is a signal which exhibits the High level when the signal GFS has the High level but exhibits the Low level when the signal GFS exhibits the Low level successively for eight times. In short, if the signal LOCK has the High level, then this indicates that the PLL circuit 39 is in a locked state, but if the signal LOCK has the Low level, then this indicates that the PLL circuit 39 is not in a locked state.

Accordingly, in steps S108 and S110 illustrated in FIG. 6, the signal LOCK can be used for discrimination processing in place of the signal GFS.

Also it is possible to utilize a sub code of a CD described hereinabove with reference to FIGS. 1 to 4.

In short, a sub code is digital data recorded as pits on a CD. Accordingly, in order for a sub code to be read out accurately, for example, at the double speed CLV, it is required that the PLL circuit 39 is locked corresponding to the double speed CLV.

Therefore, the processing in step S108 or S110 of FIG. 6 may be such that reading out of data is executed from the current accessing position and sub code data transmitted from the EFM/CIRC decoder 37 to the system controller 21 is verified to discriminate whether or not contents of the data have been decoded appropriately.

Here, if it is discriminated that the sub code data has been read out and decoded appropriately, then it is considered that the PLL circuit 39 is in a locked state. On the contrary if another discrimination result that the sub code data has not been decoded appropriately is obtained, then it is considered that the PLL circuit 39 is not in a locked state.

On the other hand, in an ordinary reproduction system for a CD, for example, if an operation for starting reproduction is not performed, for example, when a CD is loaded into the CD section, then the system automatically accesses the Lead-In Area to read out information of the TOC and stores the information of the TOC into an internal RAM of a system controller.

Here, although there is no direct relation to high speed dubbing, if reading in of the TOC after loading of the CD is performed at the double speed, then the time required for reading in of the TOC is reduced advantageously. However, also in this instance, if accessing to the Lead-In Area is performed while the CD is being rotated at the double speed CLV, then there is the possibility that tracking servo leading-in control may become difficult and a servo error condition may be entered.

Therefore, also upon accessing to the Lead-In Area in order to read the TOC at the double speed CLV, control processing is executed in accordance with the processing illustrated in FIG. 6 to make it possible to perform a stabilized tracking servo pulling-in operation in the normal speed CLV condition to turn the servo loop on and then vary the speed to the double speed CLV to effect reading in of the TOC at a high speed.

It is to be noted that the present invention is not limited to the construction of the preferred embodiment described hereinabove.

For example, while, in the embodiment described above, the double speed is set in high speed dubbing and the normal speed CLV is set upon accessing, for example, for the speed upon high speed dubbing, a multiple speed higher than the double speed may be set if sufficient reliability of the apparatus is secured. Also the disk rotational driving speed upon accessing is not limited to the normal speed, but may be set to any speed of rotation with which, as a performance of the apparatus, tracking servo leading-in can be executed stably.

Further, while the embodiment described above is a combination apparatus which includes a CD player and an MD recorder/player and can perform dubbing, for example, an actual apparatus may additionally include some other apparatus such as a radio set or a tape cassette recorder.

Further, the apparatus which can perform dubbing is not limited to the combination of a CD player and an MD recorder/player, but may be any other combination which includes a disk drive apparatus for a disk of any other type. Accordingly, the rotational driving system is not limited to the CLV system, but the CAV system or some other system may be adopted in conformity with a disk and a disk drive apparatus which are actually applied. Further, the recording side apparatus need not necessarily be for a disk medium, but may be, for example, a tape drive apparatus for a DAT or the like.

Further, since the present invention itself is applied to the reproduction apparatus side, it can be applied also to a reproduction or recording apparatus of a single unit for driving a disk, for example, at the double speed. Furthermore, in the present invention, data to be reproduced from a disk are not limited to audio data.

As described above, according to the present invention, when an operation which includes feeding or movement (displacement of the information reading out position) of an optical head itself or an objective lens of the optical head is executed, a disk is driven to rotate, for example, at a certain predetermined second rotational driving speed, but upon reproduction after the accessing, the disk is driven to rotate, for example, at a first rotational driving speed higher than the second rotational driving speed to effect reproduction.

As such a procedure as just described is executed, for example, when tracking servo control is turned on upon the accessing, a stabilized operation is obtained. Then, for example, if the reproduction apparatus of the present invention is applied to an apparatus by which high speed dubbing is performed, then since the recording side can establish synchronism in accordance with reproduction data which is inputted normally stably thereto, the reliability as a dubbing apparatus is augmented.

Further, in the present invention, since the second rotational driving speed is set when, for example, upon accessing, an operation which includes feeding of the optical head or movement of the objective lens is executed, also when random accessing between tracks is required, for example, for programmed reproduction or shuffle reproduction of a CD, a stabilized accessing operation is obtained every time. This is particularly effective where the present invention is applied to an apparatus by which high speed dubbing is performed.

Furthermore, if the reproduction method of the present invention is applied to an accessing operation for reading out information of a particular type recorded in a predetermined area on a disk (for example, the TOC in the Lead-In Area) upon starting of rotation when the disk is loaded, then the area of the TOC can be accessed stably and the TOC information can be read out at a high speed. This is effective, for example, to achieve reduction of the waiting time until reproduction of a disk becomes possible after the disk is loaded.

Further, in the present invention, in order to change the speed from the first rotational driving speed to the second rotational driving speed, it is discriminated whether or not a PLL circuit provided for extraction of a reproduction clock signal is in a locked state. Where such a discrimination operation as just described is included, a stabilized operation can be obtained when the speed is changed from the first rotational driving speed to the second rotational driving speed.

Such a discrimination as described above is possible also by a discrimination of, for example, whether data of a predetermined type recorded actually on a disk can be decoded, or in other words, whether or not reading out from the disk has been performed appropriately. Thus, some degree of freedom is available in that a suitable discrimination technique can be selectively used in accordance with conditions of actual use of the apparatus.

Furthermore, in the present invention, the speed change from the first rotational driving speed to the second rotational driving speed is performed with such a sufficiently low acceleration with which a disk secured, for example, by a chucking mechanism does not suffer from a slip. Consequently, upon accessing, for example, tracking servo control is executed appropriately in an early stage. Also in this regard, further augmentation of a stabilized accessing operation upon multiple speed reproduction is achieved.

While a preferred embodiment of the present invention has been described using specific terms, such description is for illustrative purposes only, and it is to be understood that changes and variations may be made without departing from the spirit or scope of the following claims.

What is claimed is:

1. A reproduction apparatus, comprising:
    rotational driving means for driving a disk-type recording medium to rotate;
    reproduction head means for reproducing digital information recorded on the disk-type recording medium driven to rotate by said rotational driving means;
    feeding means for feeding said reproduction head means by tracking servo control for accessing in a radial direction of the disk-type recording medium; and
    control means for controlling said rotational driving means to change over a rotational speed of the disk-type recording medium such that, within a period in which said reproduction head means reproduces the digital information recorded on the disk-type recording medium, the disk-type recording medium is rotated at a first rotational speed, but when said reproduction head means is fed in the radial direction of the disk-type recording medium by said feeding means for access of said reproduction means, the rotation speed of the disk-type recording medium is controlled to be at a second rotational speed which is lower than the first rotational speed.

2. A reproduction apparatus according to claim 1, further comprising an input for a user to input an accessing instruction, and wherein said feeding means feeds said reproduction head means in the radial direction of the disk-type recording medium in response to the accessing instruction inputted by a user of said reproduction apparatus.

3. A reproduction apparatus according to claim 1, further comprising an input for a user to input a reproduction starting instruction, and wherein said feeding means feeds said reproduction head means in the radial direction of the disk-type recording medium in response to the reproduction starting instruction inputted by a user of said reproduction apparatus.

4. A reproduction method for a reproduction apparatus which includes a reproduction head for reproducing digital information recorded on a disk-type recording medium and a feeding mechanism for feeding said reproduction head in a radial direction of the disk-type recording medium, comprising the steps of:
    driving the disk-type recording medium to rotate at a first rotational speed within a period in which the digital information is reproduced from the disk-type recording medium; and
    controlling driving the rotation speed of the disk-type recording medium to be at a second rotational speed which is lower than the first rotational speed when said reproduction head is fed in a radial direction of the disk-type recording medium.

5. A reproduction method according to claim 4, further comprising the step of receiving an accessing instruction input by a user of said reproduction apparatus, and wherein said reproduction head is fed in the radial direction of the disk-type recording medium in response to the accessing instruction inputted by a user of said reproduction apparatus.

6. A reproduction method according to claim 4, further comprising the step of receiving a reproduction starting instruction input by a user of said reproduction apparatus, and wherein said reproduction head is fed in the radial direction of the disk-type recording medium in response to the reproduction starting instruction inputted by a user of said reproduction apparatus.

* * * * *